April 21, 1970 T. V. ELLIS 3,508,265

PHASE CANCELLATION RADIO FREQUENCY SHIELD

Filed May 20, 1968 2 Sheets-Sheet 1

INVENTOR
TEDDY V. ELLIS

BY Christensen, Sanborn & Matthews

ATTORNEYS

April 21, 1970 T. V. ELLIS 3,508,265

PHASE CANCELLATION RADIO FREQUENCY SHIELD

Filed May 20, 1968 2 Sheets-Sheet 2

INVENTOR
TEDDY V. ELLIS

BY Christensen, Sanborn, & Matthews

ATTORNEYS

United States Patent Office 3,508,265

Patented Apr. 21, 1970

3,508,265
PHASE CANCELLATION RADIO FREQUENCY SHIELD

Teddy V. Ellis, 4004 13th Ave. S., Seattle, Wash. 98108

Filed May 20, 1968, Ser. No. 730,281
Int. Cl. G01s 7/36
U.S. Cl. 343—18 8 Claims

ABSTRACT OF THE DISCLOSURE

This application discloses a number of embodiments of a novel method and apparatus for shielding against electromagnetic energy in the radio frequency (RF) band. A composite structure of conductive and insulating materials is disclosed with conductive strips being arranged in a pattern on the insulating material such that electromagnetic energy in the RF band coupled to the strips will undergo a phase reversal and in effect be re-radiated in a phase which is such that cancellation occurs. In one embodiment the thin conductive strips are arranged in complete closed loops around the surface of a container adapted for holding electronic equipment which is to be shielded from RF fields or which is to house electronic equipment in a manner to prevent the escape of undesired RF fields. A unique RF gasket is disclosed for use with the container to permit ready access to the interior of the container while simultaneously avoiding the problems heretofore encountered with such containers having access lids. Specific details and theories of operation for the unique phase canceling shields are disclosed.

At the present time two primary methods of shielding against undesirable electromagnetic energy in the radio frequency band have been utilized. One method is to enclose the energy generating equipment in a shield of electrically conductive material, and the other is to dissipate the radiated energy in an electrically resistive material. Each of these methods are found to depend to a large extent on the skin depth of the radio frequency energy in the selected conductive or resistive material. In the case of shielding with conductive materials, it is found that the seams and access covers which are necessary for entry to a container housing radiating equipment present gasket problems in that as the frequency of the fields involved becomes relatively low the gasket material used to seal the covers becomes essentially ineffective. In the case of dissipation of RF energy it is found that as the resistance of the material increases the skin depth increases and thus the material must be relatively thick at lower frequencies (especially below 1000 mHz.). Also in the case of shielding using conductive material, it is found that the skin depth of the circulating currents, which dissipate the energy, increases as the frequency decreases. Accordingly, these two techniques result in the need for thick materials and associated waste of space when applied to radio frequency energy in the UHF band and below.

It is therefore an object of the present invention to provide an improved method and apparatus for shielding against radio frequency energy. A further object is to provide RF shields using phase canceling conductive surfaces arranged in selected patterns in the path of the radio frequency energy. A further object of the present invention is to provide a low cost and highly effective radio frequency shield which is particularly well adapted to the shielding of equipment from radio frequency fields below 1000 mHz.

Another object of the present invention is to provide a container for electronic equipment which container serves to substantially prevent the passage of radio frequency energy of selected frequencies therethorugh. A further object is to provide such a phase canceling radio frequency shield which becomes increasingly effective as the frequency involved is decreased.

An additional object is to provide a phase canceling RF shield in the form of rigid sheets and containers or flexible sheets.

The above as well as additional advantages and objects of the invention are achieved through the use of a phase canceling assembly having electrical conductive surfaces arranged in spaced relation with the conductors being arranged substantially parallel to the electric field vector of the RF field in which the material is used. Through the use of composite structures having an electrical impedance matching surface facing the radiating source a substantially nonreflective shield is provided. In one embodiment of the invention a container is illustrated as being fabricated from the shield material and is provided with a novel gasket which permits the container to have an easily removable lid and yet the normal problems associated with leakage are avoided.

The inventive concepts will be more clearly understood by reference to the accompanying drawings showing presently preferred embodiments and wherein FIGURE 1 is a perspective view showing one type of phase cancellation shielding material together with legends and symbols referred to for teaching the theory believed to account for the results obtained by the invention.

Figure 1:
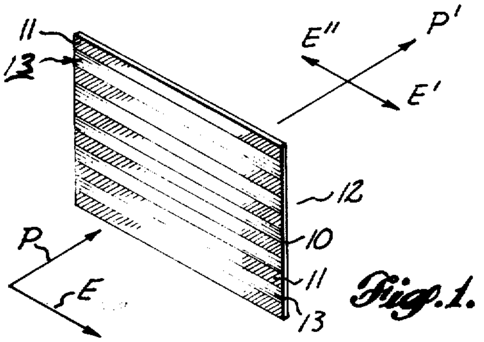

Turning now to the drawings and in particular to FIGURE 1, there is illustrated a sheet of insulating material 10 having a plurality of parallel strips of electrically conductive material 11 spaced one from the other thereon. The conductive strips 11 can be any suitable metal foil and can readily be fabricated in place on the insulating backing member 10 using present well known plating and etching techniques. In FIGURE 1 the arrow P indicates the propagation of radio frequency energy into the phase cancellation shield 12 made from the insulating and conducting materials 10 and 11. The vector E represents the electric field polarized in the same plane and parallel to the strips 11. On the opposite side of the shield 12 the arrow P′ indicates energy propagation after passing through the shield with E′ representing the polarization of the electric field passing between the strips 11 through the spaces 13 which separate adjacent conductive strips. The vector E″ shows the polarization of the electric energy re-radiated by the strips 11 due to the RF energy striking them. It will be seen that the vectors E′ and E'' are opposite in phase. The result therefore is that phase cancellation occurs. While the thickness of the strips 11 is not particularly critical it is found that in the assembly of FIGURE 1 the length of the conductive strips should be at least one-half wavelength of the radiated frequency to be shielded against (and preferably one-half wave-length or multiples of one-half wavelength), the width should be less than one-half wavelength, and the strips should be oriented parallel to the electric field vector of the RF field.

Figure 4:
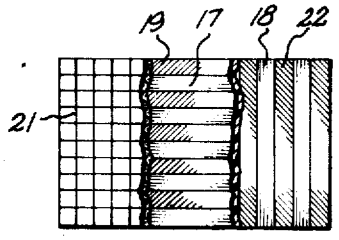
FIGURE 4 is a front view partially cut away showing a composite structure for shielding against RF fields regardless of the angle of impingement of the electric vector of the RF fields.

The strips 11 are formed from conductive material, although as seen in FIGURE 4 a surface member such as indicated at 21 in FIGURE 4 (and described below) can serve as an impedance match. It has been found that when a continuous sheet of insulating material 10 is utilized with the strips bonded or laminated thereon, the thickness of the insulating material is not critical when the arrangement is used in the far field where the strips will not couple electrically to surrounding conductors. When the shield is applied to a conductive surface (for example on antenna elements, RF chassis, or RF cabinets) the insulation 10 should have a low dielectric constant and must be placed between the conductive strips 11 and the conductive surface of such elements, chassis, or cabinets in order to minimize capacity between the strips and the surface. The strips 11 in such case can also be constructed of fine wire to further reduce capacitance effects.

Figure 2:
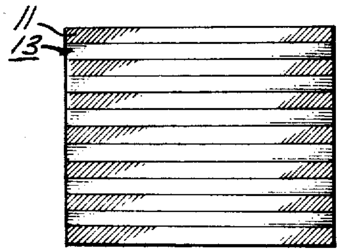
FIGURE 2 is a front view of the sheet material illustrated in FIGURE 1.
Figure 3:
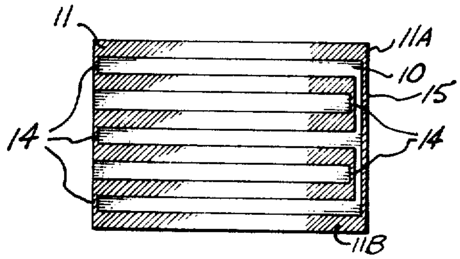
FIGURE 3 is a further embodiment similar to that of FIGURES 1 and 2 but having closed conductive paths for the entire sheet of material.

In the embodiment of the invention illustrated in FIGURE 3 the conductive strips 11 are interconnected at alternate ends by the conductive members 14. The conductive member 15 on the right end serves to interconnect the topmost strip 11A and the bottommost strip 11B. Thus a closed loop is formed. The result is that the spacing effect is reduced without any need for impedance matching. As in the embodiment of FIGURES 1 and 2, the conductive strips in FIGURE 3 are bonded or laminated onto a sheet of suitable electric insulating material.

In the embodiment of the invention illustrated in FIGURE 4 a sheet of fine mesh electrically conductive screen material 21 is adapted to face the source of radiant energy. Circulating currents will therefore be induced in the mesh sheet causing re-radiation in the direction of the original propagation. Phase cancellation to horizontal polarization results dues to the horizontal conductive strips 19 bonded to the insulating sheet 17 while cancellation to vertically polarized energy is accomplished by the vertical strips 22 bonded to the insulating sheet 18 which is disposed on top of the conductive strips 19. It will of course be recognized that vector resultant attenuation will occur to energy which is polarized such that the electric field thereof is neither truly horizontal or vertical. For best results with minimum reflection the screen 21 matches the space impedance with strips 19 and 22 being made from highly conductive material such as copper.

Figure 5:
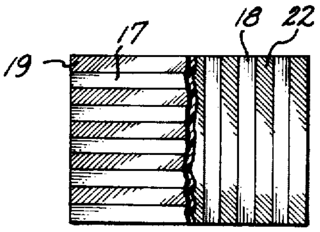
FIGURE 5 is a further embodiment similar to that of FIGURE 4 with part of the front surface removed to show the construction details.

In the embodiment of FIGURE 5 the arrangement corresponds to that of FIGURE 4 except in FIGURE 5 the conductive screen 21 is not utilized. In the embodiment of FIGURE 5 the position of the shield in the field should be taken into consideration in choosing the material for the strips 19 and 22 so that an approximate impedance match is obtained.

In the above-described embodiments the desired shielding effect is believed to be achieved as a result of phase reversal by induction. That is, the impinging electromagnetic energy sets up certain fields within the material with such fields being of reversed phase with respect to the impinging radiation so that when the same is re-radiated and combined with energy which has not undergone such a phase reversal, then phase cancellation occurs. The embodiments shown in FIGURES 1–5 are thus primarily useful in those applications wherein the shield material is to be positioned between the source of RF energy and the object to be shielded.

Figure 6:
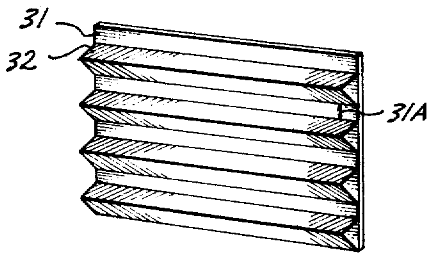
FIGURES 6 and 6A are views of further shielding structures with FIGURE 6A being an enlargement of one portion of the assembly of FIGURE 6 and showing the manner in which the phase cancellation occurs to achieve the shielding effect.
Figure 6A:
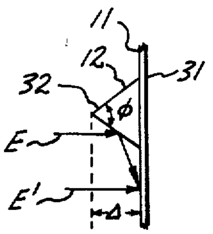

In the embodiment of the invention illustrated in FIGURES 6 and 6A phase cancellation due to reflection of RF energy is achieved. Thus in FIGURE 6 wedge-shaped conductive strips 32 are bonded or laminated on the conductive sheet 31 with adjacent conductive wedges (or triangular-shaped members) 32 being separated from each other by distance 31A. The apex of the triangular strips 32 is directed toward the source of RF energy so that energy striking the strips will reverse in phase as it reflects towards the conductive sheet 31. As seen most clearly in FIGURE 6A the impinging energy E which strikes the conductive strips 32 and is reflected toward the conductive sheet 31 undergoes a phase reversal. It therefore serves to cancel the direct energy E' passing between the strips and striking the conductive surface 31. The apex of the angle $\theta$, the depth or spacing of the wedge of conductive material ($d$) and the spacing of the wedges 31A can be adjusted for maximum attenuating properties. These geometric adjustments are made to allow equal and opposite forces to strike the conductive surface 31.

Figure 7:
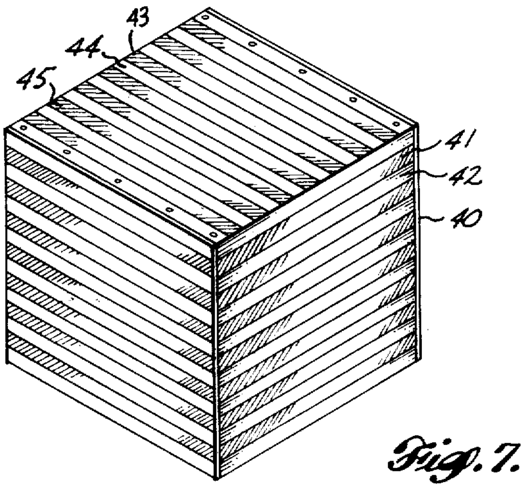
FIGURE 7 is a perspective view of a container made from the radio frequency shielding material of the present invention with FIGURES 7A and 7B being enlarged views of one corner and of the gasket material, respectively, shown in FIGURE 7.
Figure 7A:
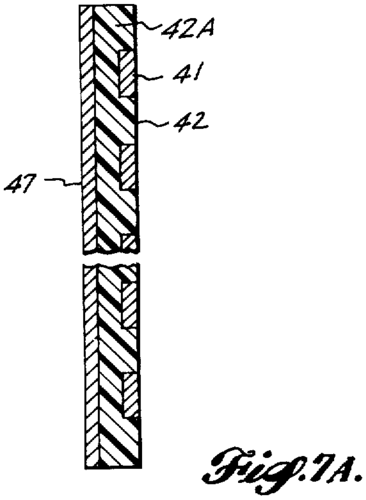

In FIGURE 7 the shield material of FIGURES 1 and 2 is shown as being used in constructing the shielded container 40. Thus the container 40 is seen to have four side walls composed of alternate conductive and insulating strips 41 and 42 with the strips 41 of the adjacent walls being electrically interconnected to form a stack of closed loops. The top and bottom of the container 40 is similarily made of alternate conductive and insulating strips 43 and 44 with the top 45 being removable so that access can be had to the interior of the container for servicing of electronic equipment housed therein. As seen in FIGURE 7A the strips 41 of conductive material are preferably embedded in the sheet of insulating material 42A so that the strips of insulating material 42 are provided between adjacent ones of the conductive strips 41. Also the sheet of low dielectric insulating material 42A is bonded to the sheet of electrically conductive material 47. Each of the four walls, the top, and the bottom of the container of FIGURE 7 are constructed in the manner shown in FIGURE 7A.

Figure 7B:
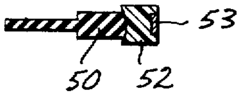

In the construction of shielding containers it has been found that gasket materials for preventing the leakage of RF fields, particulary in the low frequency range, presents a problem. Thus it will be seen in FIGURE 7B that a novel assembly is provided for sealing the lid of the container in position. Thus as seen in FIGURE 7B a strip of the RF gasket material 50 is attached to the strip of low dielectric insulating material 52 with a thin electric conductor 53 being embedded in the insulating material 52.

There has thus been disclosed an improved radio frequency shield and related apparatus constructed therefrom for reducing the intensity of radio frequency energy. It is believed that the improved shielding characteristics are due to transformer action setting up radiating field in the conductive strips so that the fields re-radiated from the strips will be out of phase with the directly radiated field, and thereby result in signal energy cancellation.

What is claimed is:

1. A phase cancellation radio frequency signal shield comprising: a plurality of parallel co-planar strips of electrically conductive material and means supporting each of said strips a fixed distance from an adjacent strip, each of said strips being of a length substantially equal to a multiple of one-half of the wavelength of the signal to be shielded against; first conductive means interconnecting alternate adjacent ends of adjacent strips; and second conductive means interconnecting the ends of two non-adjacent strips to thereby form a single continuous conductive member having the strips in electric series circuit and parallel physical relation.

2. A phase cancellation radio frequency signal shield comprising: a plurality of parallel co-planar strips of electrically conductive material and means supporting each of said strips a fixed distance from an adjacent strip, each of said strips being of a length substantially equal to a multiple of one-half of the wavelength of the signal to be shielded against; a second plurality of co-planar conductive strips; and means holding said second plurality of strips perpendicular to said first plurality and in a plane parallel to the plane of said first plurality.

3. The apparatus of claim 2 including a grid of conductive members attached to and insulatively spaced from said first plurality of strips, said grid including a plurality of closed loops of conductive material.

4. A radio frequency signal shielding housing comprising: means defining a plurality of side walls, a plurality of closed loops of conductive material extending around said walls with the said loops being insulated from each other and maintained parallel to each other, said loops being separated from each other by a distance of less than one-half the wavelength of the signals to be shielded against, and means defining a removable top closure including a plurality of parallel strips of conductive material insulatively spaced from each other.

5. The apparatus of claim 4 including a layer of conductive material disposed on the interior of and completely covering said walls and said top closure and including means insulating said layer of material from said closed loops and said strips.

6. The apparatus of claim 4 including a gasket disposed between said cover and said walls comprising an elongated closed loop of radio frequency gasket material having a closed loop of insulating material disposed about and secured to the periphery thereof, and a closed loop of conductive material embedded in the exterior portion of said insulating material.

7. The method of shielding a source of radio frequency electromagnetic energy to substantially reduce the radiated field intensity comprising the steps of placing a plurality of elongated strips of electrically conductive material in the field with each strip parallel to the electric vector of the field, and maintaining said strips co-planar and separated from each adjacent strip by a distance such that the energy re-radiated by each strip combines with energy passing between adjacent strips to thereby cause signal cancellation due to re-combination of out of phase signals.

8. The method of claim 7 wherein the number and spacing of the strips is selected to cause phase reversal of one half of the total RF energy passing through the total area encompassed by the strips.

References Cited

UNITED STATES PATENTS

| | | | |
|---|---|---|---|
| 2,771,602 | 11/1956 | Kuhnhold ----------- | 343—18 |
| 2,992,426 | 7/1961 | Borcherdt ----------- | 343—18 |

RICHARD A. FARLEY, Primary Examiner

B. L. RIBANDO, Assistant Examiner